US012413640B2

(12) United States Patent
Wang et al.

(10) Patent No.: US 12,413,640 B2
(45) Date of Patent: Sep. 9, 2025

(54) NEAR DATA PROCESSING (NDP) IN NETWORK NODES

(71) Applicant: Huawei Technologies Co., Ltd., Guangdong (CN)

(72) Inventors: Yong Wang, Westborough, MA (US); Theodoros Gkountouvas, Burlington, MA (US); Hui Lei, Scarsdale, NY (US); Hongliang Tang, Hopkinton, MA (US); Ning Wu, Northborough, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 180 days.

(21) Appl. No.: 18/223,908

(22) Filed: Jul. 19, 2023

(65) Prior Publication Data

US 2023/0370522 A1    Nov. 16, 2023

Related U.S. Application Data

(63) Continuation of application No. PCT/US2021/015015, filed on Jan. 26, 2021.

(51) Int. Cl.
*G06F 15/16* (2006.01)
*G06N 7/01* (2023.01)
(Continued)

(52) U.S. Cl.
CPC .......... *H04L 67/1097* (2013.01); *G06N 7/01* (2023.01); *H04L 67/1008* (2013.01)

(58) Field of Classification Search
None
See application file for complete search history.

(56) References Cited

U.S. PATENT DOCUMENTS

| 2018/0075158 A1* | 3/2018 | Li ..................... G06F 16/9024 |
| 2020/0145318 A1 | 5/2020 | Nainar et al. |

FOREIGN PATENT DOCUMENTS

| WO | WO-2019086765 A1 | 5/2019 |
| WO | WO-2022164418 A1 | 8/2022 |

OTHER PUBLICATIONS

"International Application Serial No. PCT/US2021/015015, International Search Report mailed Oct. 12, 2021", 5 pgs.
(Continued)

*Primary Examiner* — Wing F Chan
*Assistant Examiner* — Andrew Woo
(74) *Attorney, Agent, or Firm* — Schwegman Lundberg & Woessner, P.A.

(57) ABSTRACT

In some implementations, a storage node receives data processing instructions from a compute node of a network architecture. The storage node detects a Directed Acyclic Graph (DAG) within the data processing instructions. The DAG includes a plurality of data processing operations arranged within the DAG according to an execution. The data processing operations further include user-defined function (UDF) information associated with a UDF. The storage node may retrieve a first data object from an object store of the distributed storage node based on object keys information within the plurality of data processing operations. The storage node may execute the plurality of data processing operations using the retrieved first data object to generate a DAG execution result, the executing of the plurality of data processing operations based on the execution order. The storage node may communicate the DAG execution result to the compute node in response to the data processing instructions.

20 Claims, 9 Drawing Sheets

(51) Int. Cl.
*H04L 67/1008* (2022.01)
*H04L 67/1097* (2022.01)

(56) References Cited

OTHER PUBLICATIONS

"International Application Serial No. PCT/US2021/015015, Written Opinion mailed Oct. 12, 2021", 8 pgs.
Yu, Xiangyao, et al., "PushdownDB: Accelerating a DBMS Using S3 Computation", IEEE 36th International Conference on Data Engineering (ICDE), IEEE, (Apr. 20, 2020), 1802-1805.
"International Application Serial No. PCT US2021 015015, International Preliminary Report on Patentability mailed Aug. 10, 2023", 10 pages.

* cited by examiner

NEAR DATA PROCESSING (NDP) IN NETWORK NODES

CROSS-REFERENCE TO RELATED APPLICATIONS

This application is a continuation of International Application No. PCT/US2021/015015, filed on Jan. 26, 2021, entitled "NEAR DATA PROCESSING (NDP) IN NETWORK NODES," the benefit of priority of which is claimed herein, and which application is hereby incorporated herein by reference in its entirety.

TECHNICAL FIELD

The present disclosure is related to the processing of data in disaggregated architectures. Some aspects relate to near data processing (NDP) in network nodes such as distributed storage nodes (or other types of network nodes) within a storage network.

BACKGROUND

Public cloud networks (e.g., Big Data Analytics (BDA) or Artificial Intelligence (AI) based networks) often employ an architecture where the computation and storage are disaggregated, namely, the two components are independently managed and connected using intermediate networks. While disaggregated architectures allow for independent scaling of computation and storage, which simplifies the management of storage and reduces its cost, such architectures are associated with several shortcomings. For example, the intermediate networks that connect the computation and storage layers can be a significant performance bottleneck due to the internal bandwidth of the storage devices being much higher than the external network bandwidth. As a result, a platform running on a disaggregated architecture may underperform a platform on a conventional shared-nothing architecture.

SUMMARY

Various examples are now described to introduce a selection of concepts in a simplified form that is further described below in the detailed description. The Summary is not intended to identify essential features of the claimed subject matter, nor is it intended to be used to limit the scope of the claimed subject matter.

According to a first aspect of the present disclosure, there is provided a computer-implemented method for near data processing (NDP) within a distributed storage node of a network architecture. The computer-implemented method includes receiving, at the distributed storage node, data processing instructions from a compute node of the network architecture. The computer-implemented method further includes detecting a Directed Acyclic Graph (DAG) within the data processing instructions. The DAG includes a plurality of data processing operations. The plurality of data processing operations are arranged within the DAG according to an execution order and include user-defined function (UDF) information associated with a UDF. The method further includes retrieving a first data object from an object store of the distributed storage node based on object keys information within the plurality of data processing operations. The method further includes executing the plurality of data processing operations using the retrieved first data object to perform the UDF and generate a DAG execution result, the executing of the plurality of data processing operations based on the execution order. The method further includes communicating the DAG execution result to the compute node in response to the data processing instructions.

In a first implementation form of the computer-implemented method according to the first aspect as such, the method further includes detecting that the data processing instructions include the DAG and a legacy data processing operation. The method further includes routing the legacy data processing operation to an object service of the distributed storage node for execution using a second data object from the object store. The second data object is selected based on second object keys information within the legacy data processing operation.

In a second implementation form of the computer-implemented method according to the first aspect as such or any preceding implementation form of the first aspect, where the legacy data processing operation includes a non-complex query-based operation or a raw request operation. The raw request operation includes at least one of a get operation, a put operation, a post operation, and a delete operation. The non-complex query-based operation includes at least one of a filter operation and an aggregation operation.

In a third implementation form of the computer-implemented method according to the first aspect as such or any preceding implementation form of the first aspect, the DAG is routed to an NDP service of the distributed storage node. The NDP service configures virtual resources of the distributed storage node to perform the retrieving of at least the first data object and the executing of the plurality of data processing operations using the retrieved first data object.

In a fourth implementation form of the computer-implemented method according to the first aspect as such or any preceding implementation form of the first aspect, where the plurality of data processing operations includes a complex query-based operation. The complex query-based operation further includes the object keys information and object location information specifying a storage bucket of the object store that stores the first data object.

In a fifth implementation form of the computer-implemented method according to the first aspect as such or any preceding implementation form of the first aspect, where the UDF information includes UDF application code of the UDF and the object keys information.

In a sixth implementation form of the computer-implemented method according to the first aspect as such or any preceding implementation form of the first aspect, the UDF application code is executed using a serverless framework of the distributed storage node to perform a runtime query-based invocation of the UDF as a serverless function using the first data object associated with the object keys information.

In a seventh implementation form of the computer-implemented method according to the first aspect as such or any preceding implementation form of the first aspect, where performing the runtime query-based invocation of the UDF further includes deploying a plurality of container-based function invocations within the serverless framework of the distributed storage node to perform the UDF.

In an eighth implementation form of the computer-implemented method according to the first aspect as such or any preceding implementation form of the first aspect, where the plurality of container-based function invocations within the serverless framework of the distributed storage node are configured to exchange state information via shared storage within the object store of the distributed storage node.

In a ninth implementation form of the computer-implemented method according to the first aspect as such or any preceding implementation form of the first aspect, the computer-implemented method further includes executing the UDF application code using a virtual machine or a container instantiated within the distributed storage node.

In a tenth implementation form of the computer-implemented method according to the first aspect as such or any preceding implementation form of the first aspect, the UDF information includes a request for invocation of the UDF on the first data object, the UDF information further specifies a location within a function registry of the object store that stores UDF application code of the UDF, and the computer-implemented method further includes executing the UDF application code from the function registry to perform a runtime query-based invocation of the UDF as a serverless function.

In an eleventh implementation form of the computer-implemented method according to the first aspect as such or any preceding implementation form of the first aspect, where the UDF information specifies an object store event as an invocation trigger for an event-driven invocation of the UDF as a serverless function, the UDF information further specifies a location within a function registry of the object store that stores UDF application code of the UDF, and the computer-implemented method further includes detecting the object store event specified by the UDF information, the object store event associated with a data update of the object store. Based on the detecting of the object store event, the UDF application code is executed from the function registry to perform the event-driven invocation of the UDF as a serverless function.

According to a second aspect of the present disclosure, there is provided a system including a memory that stores instructions and one or more processors in communication with the memory. The one or more processors execute the instructions to receive at a distributed storage node, data processing instructions from a compute node of a network architecture. A Directed Acyclic Graph (DAG) is detected within the data processing instructions. The DAG includes a plurality of data processing operations. The plurality of data processing operations is arranged within the DAG according to an execution order and including user-defined function (UDF) information associated with a UDF. A first data object is retrieved from an object store of the distributed storage node based on object keys information within the plurality of data processing operations. The plurality of data processing operations is executed using the retrieved first data object to perform the UDF and generate a DAG execution result. The execution of the plurality of data processing operations is based on the execution order. The DAG execution result is communicated to the compute node in response to the data processing instructions.

In a first implementation form of the system according to the second aspect as such, the UDF information includes a UDF application code of the UDF and the object keys information, and the one or more processors execute the instructions to execute the UDF application code using a serverless framework of the distributed storage node to perform a runtime query-based invocation of the UDF as a serverless function using the first data object associated with the object keys information.

In a second implementation form of the system according to the second aspect as such or any preceding implementation form of the second aspect, where to perform the runtime query-based invocation of the UDF as a serverless function, the one or more processors execute the instructions to deploy a plurality of container-based function invocations within the serverless framework of the distributed storage node to perform the UDF.

In a third implementation form of the system according to the second aspect as such or any preceding implementation form of the second aspect, where the plurality of container-based function invocations within the serverless framework of the distributed storage node are configured to exchange state information via shared storage within the object store of the distributed storage node.

According to a third aspect of the present disclosure, there is provided a non-transitory computer-readable medium storing instruction for near data processing (NDP) within a distributed storage node of a network architecture, that when executed by one or more processors, causes the one or more processors to perform operations. The operations include receiving at the distributed storage node, data processing instructions from a compute node of the network architecture. A Directed Acyclic Graph (DAG) is detected within the data processing instructions. The DAG includes a plurality of data processing operations. The plurality of data processing operations is arranged within the DAG according to an execution order and including user-defined function (UDF) information associated with a UDF. A first data object is retrieved from an object store of the distributed storage node based on object keys information within the plurality of data processing operations. The plurality of data processing operations is executed using the retrieved first data object to perform the UDF and generate a DAG execution result. The execution of the plurality of data processing operations is based on the execution order. The DAG execution result is communicated to the compute node in response to the data processing instructions.

In a first implementation form of the non-transitory computer-readable medium according to the third aspect as such, where the UDF information includes a UDF application code of the UDF and the object keys information, and the instructions further cause the one or more processors to execute the UDF application code using a virtual machine or a container instantiated within the distributed storage node.

In a second implementation form of the non-transitory computer-readable medium according to the third aspect as such, where the UDF information includes a request for invocation of the UDF on the first data object, the UDF information further specifies a location within a function registry of the object store that stores UDF application code of the UDF, and the instructions further cause the one or more processors to perform operations including executing the UDF application code from the function registry to perform a runtime query-based invocation of the UDF as a serverless function.

In a third implementation form of the non-transitory computer-readable medium according to the third aspect as such, where the UDF information specifies an object store event as an invocation trigger for an event-driven invocation of the UDF as a serverless function, the UDF information further specifies a location within a function registry of the object store that stores UDF application code of the UDF, and the instructions further cause the one or more processors to perform operations including detecting the object store event specified by the UDF information, the object store event associated with a data update of the object store. The operations further include executing, based on the detecting of the object store event, the UDF application code from the function registry to perform the event-driven invocation of the UDF as a serverless function.

Any one of the foregoing examples may be combined with any one or more of the other foregoing examples to create a new embodiment within the scope of the present disclosure.

BRIEF DESCRIPTION OF THE DRAWINGS

The drawings illustrate generally, by way of example, but not by way of limitation, various embodiments discussed in the present document.

DETAILED DESCRIPTION

Figure 1:
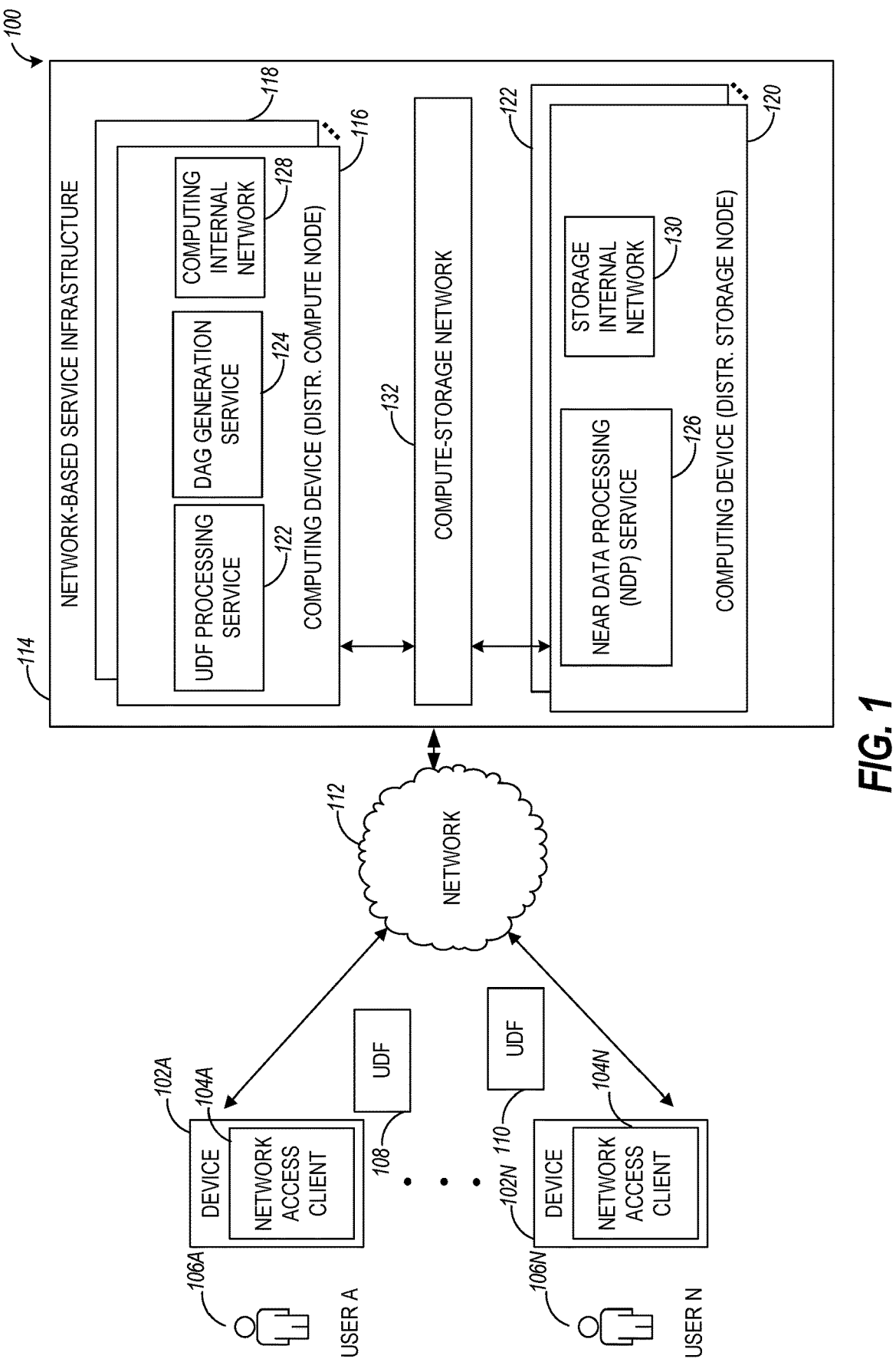
FIG. 1 is a high-level system overview of a network architecture using a near data processing (NDP) service, according to some example embodiments.

It should be understood at the outset that although an illustrative implementation of one or more embodiments is provided below, the disclosed systems and/or methods described with respect to FIGS. 1-9 may be implemented using any number of techniques, whether currently known or not yet in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the following description, reference is made to the accompanying drawings that form a part hereof, and which are shown, by way of illustration, specific embodiments which may be practiced. These embodiments are described in sufficient detail to enable those skilled in the art to practice the inventive subject matter, and it is to be understood that other embodiments may be utilized, and that structural, logical, and electrical changes may be made without departing from the scope of the present disclosure. The following description of example embodiments is, therefore, not to be taken in a limiting sense, and the scope of the present disclosure is defined by the appended claims.

As used herein, the term "network-based service infrastructure" includes a plurality of network devices (also referred to as hosts, nodes, or servers) providing on-demand computing capacity (e.g., via one or more virtual machines or other virtual resources running on the network devices) and storage capacity as a service to a community of end-recipients (e.g., customers of the service infrastructure), where the end recipients are communicatively coupled to the network devices within the service infrastructure via a network. The customers of the service infrastructure can use one or more computing devices (or customer devices) to access and manage the services (including any Function-as-a-Service (or FaaS)) provided by the service infrastructure via the network. The customer devices, the network, and the network-based service infrastructure can be collectively referred to as a "network architecture." The customers of the service infrastructure can also be referred to as "users."

As used herein, the term "disaggregated architecture" indicates a network architecture where the computation and storage are disaggregated, and separate compute and storage networks are used.

As used herein, the term "Near Data Processing (NDP)" indicates placing the processing power near the data (e.g., as part of a distributed storage node within a storage network), rather than shipping the data for processing to a compute node in a compute network.

Different analytics/compute platforms (e.g., Spark®, TensorFlow®, and Hive®) have their analytics mechanism for compute, which mechanisms are normally only understood by the compute platforms themselves. As used herein, the term "Semantic-Aware Pushdown" (or "pushdown") indicates data processing where NDP is pushed into a storage node, while not pushing down the entire compute platform. As a result, data processing functions previously performed by a compute node are now performed (e.g., by the disclosed NDP service) within a distributed storage node.

As used herein, the term "serverless compute" or "serverless framework", also known as FaaS, indicates executing application logic without a requirement of function developers and operators to know deploying, scaling, capacity planning, and maintenance operations. Conventionally, a serverless framework runs on the compute side only and is stateless. Using the disclosed techniques, a serverless framework is used as part of the NDP service within a distributed storage node, while there are needs for NDP to run serverless in storage and maintain certain states.

As used herein, the term "query" on any data indicates a structured query language (SQL) style of query on structured, semi-structured, and unstructured data. In NDP, queries may be executed in the storage layer.

As used herein, the term "User Defined Function (UDF)" refers to any user-defined functions that can perform pre-processing, runtime processing, and post-processing of data including, but not restricted to, common database operations (e.g., SQL operations). In an NDP context, the concept of a UDF is extended to cover any external functions that can be executed as part of the SQL operation or be executed outside the SQL operation such as upon upload/download/access of certain objects in storage (e.g., during an event-driven invocation of a UDF).

As used herein, the term "Directed Acyclic Graph (DAG)" indicates a graph based on a mathematical algorithm that analytics platforms are using for query plan generation. A DAG defines the order and content of execution steps, normally on the compute side. In an NDP context and as discussed herein, certain portions of a DAG may be pushed down for execution in a storage node instead, while analytics platforms can still execute the rest of the DAG in a compute node and send back the entire result to the user after the partial DAG execution results are reported by the storage node.

As used herein, the term "acceleration" is associated with hardware acceleration such as processor acceleration (e.g., using a graphics processing unit (GPU) and a Single Instruction Multiple Data (SIMD) CPU as well as software acceleration (e.g., using a high-speed parser). SIMD is a class of parallel computing processes that are commonly used for speeding up certain digital image/graph processing or certain Deep Learning training that is also based on complex graph processes such as neural networks. Acceleration may be used in the analytics of big data as well.

As used herein, the term "data skipping" indicates a technique that can minimize unnecessary data transfer from storage to compute, it normally uses data skipping indexes to apply to a structured dataset, and store summary metadata for each object in the dataset. For example, if the dataset has a temperature column, the summary metadata could include the minimum and maximum temperatures in the object. This summary metadata, which is significantly smaller than the data itself, can be indexed so when a query is looking for temperatures greater than 90 F, it can then benefit from the index by skipping over all objects whose metadata does not overlap with the predicate.

Disclosed techniques use NDP to push computational tasks from a compute network into a storage network to mitigate the network bottleneck associated with data processing in disaggregated architectures. Benefits associated with NDP include the following: significant reduction of network traffic between computation and storage, especially with regard to high-selectivity computation requests; reduction of storage input/output (I/O); speeding up overall processing time to achieve better support for product service level agreement (SLA) goals and better customer experience; assist the compute network with mitigating the "too big to eat" problem, which refers to computations like Spark that use an "ingest then compute" scheme (if the amount of ingestion data becomes too big, this scheme may cause computational issues increasing unnecessary shuffle, out of memory, and waste of computation resources); taking full advantage of storage system resources as a supplement to compute resources; reduce cost as including more processing power into a storage system can be less expensive than improving high bandwidth network pipelines; improve data privacy and regulation (e.g., NDP can mask out the sensitive information without the data leaving the storage system).

Existing NDP techniques are associated with certain challenges both in terms of protocol and architecture considerations. For example, existing NDP techniques do not support complex query pushdown. Instead, existing NDP techniques only support the pushdown of simple query operations from computation platforms like Spark and TensorFlow. The main reason for this restriction is that these simple operations do not need further optimizations and the storage system can use a simple query engine to serve NDP while supporting different compute platforms on the same storage system. In this regard, it will be difficult for a storage system to optimize complex queries for each of the compute platforms. Additionally, existing data processing protocols do not use application-specific and optimized task/query plans (e.g., in the form of a DAG) to be pushed down to the storage layer for NDP.

For Big Data Analytics and Artificial Intelligent (BDA/AI), UDF pushdown into the storage layer can be considered an important functionality as multiple operations (e.g., "extract, transform, load" (ETL) operations, machine learning (ML) operations, and deep learning (DL) operations) that cannot be accomplished by query alone can be implemented in UDFs. Furthermore, modern compute platforms like Spark normally invoke UDFs in combination with queries during runtime. However, existing NDP techniques do not support the pushdown of UDFs together with queries for NDP processing in a storage layer.

Additional drawbacks of existing NDP techniques are associated with architecture implementation. More specifically, existing NDP techniques lack in providing portability of NDP to different storage systems, which results in a duplicate effort to port one NDP service from one type of data processing system to another. Furthermore, there is no generic architecture to allow an NDP service to be executed on different storage system types, where the NDP service also includes a serverless framework for UDF processing.

In comparison to existing solutions, the disclosed NDP techniques associated with a storage node-based NDP service can be used to perform complex SQL pushdown, independent UDF pushdown, UDFs with SQL pushdown (e.g., via a DAG pushdown), hardware acceleration at the storage node level, storage I/O optimization using object indexing within the storage node, semantic awareness for multiple compute platforms and performing NDP using a serverless framework as part of the NDP service. More specifically, a semantic-aware protocol is used to send application-specific and optimized query/task plans in a DAG to the storage layer, so that the storage node-based NDP service can perform data processing functions to obtain the optimization that is specific to the application and workflow associated with the DAG. In this regard, multiple applications can run the disclosed NDP service with respectively optimized execution plans (e.g., implemented via a DAG) on the same storage system. The disclosed NDP service further supports extended runtime and event-based UDFs pushdown support for BDA and AI use cases.

The disclosed NDP service uses different broker modules to facilitate the processing of simple queries as well as DAGs that include complex queries and UDFs. For example, the disclosed NDP service uses a storage request broker to redirect/intercept DAGs to an independent NDP service broker for processing. The NDP service can be deployed as part of a distributed storage node or outside the storage node (e.g., as an external NDP device in a storage network) which makes it highly portable and versatile. Additionally, the NDP service supports various data processing techniques including providing a serverless (or Function-as-a-Service (FaaS)) framework for NDP of UDFs, facilitating distributed processing, parallelism, and tenant security.

FIG. 1 is a high-level system overview of a network architecture 100 using a near data processing (NDP) service, according to some example embodiments. Referring to FIG. 1, the network architecture 100 can include a plurality of devices (e.g., user devices) 102A, . . . , 102N (collectively, devices 102) communicatively coupled to a network-based service infrastructure 114 via a network 112. The devices 102A, . . . , 102N are associated with corresponding users 106A, . . . , 106N and can be configured to interact with the network-based service infrastructure 114 using a network access client, such as one of network access clients 104A, . . . , 104N. The network access clients 104A, . . . , 104N can be implemented as web clients or application (app) clients.

Users 106A, . . . , 106N may be referred to generically as "a user 106" or collectively as "users 106." Each user 106 may be a human user (e.g., a human being), a machine user (e.g., a computer configured by a software program to interact with the devices 102 and the network-based service infrastructure 114), or any suitable combination thereof (e.g., a human assisted by a machine or a machine supervised by a human). The users 106 are not part of the network architecture 100 but are each associated with one or more of the devices 102 and maybe users of the devices 102 (e.g., the user 106A may be an owner of the device 102A, and the user 106N may be an owner of the device 102N). For example, device 102A may be a desktop computer, a vehicle computer, a tablet computer, a navigational device, a portable media device, or a smartphone belonging to user 106A. Users 106A, . . . , 106N can use devices 102A, . . . , 102N to access services (e.g., serverless computing services or FaaS, UDF processing service 122, DAG generation service 124, and NDP service 126) provided by the network-based service infrastructure 114. In this regard, users 106 can also be referred to as "customers 106" or "tenants 106" of the network-based service infrastructure 114. The serverless computing services can include instantiating and using, e.g., virtual machines (VMs), virtual private clouds (VPCs), and application containers in connection with FaaS-related functionalities. In some embodiments, users 106A, . . . , 106N can use devices 102A, . . . , 102N to specify UDFs 108, . . . , 110 which can be processed by the UDF processing service 122 or used for generating one or more DAGs by the DAG generation service 124.

The network-based service infrastructure 114 includes a plurality of computing devices 116, . . . , 118 configured as distributed compute nodes forming a compute network and performing compute tasks, such as tasks associated with the UDF processing service 122 and the DAG generation service 124. The network-based service infrastructure 114 also includes a plurality of computing devices 120, . . . , 122 configured as distributed storage nodes forming a storage network, with one or more of the distributed storage nodes (e.g., distributed storage node 120) configured with the NDP service.

The UDF processing service 122 comprises suitable circuitry, logic, interfaces, and/or code and is configured to process the UDFs 108, . . . , 110 provided by users 106A, . . . , 106N and received from devices 102A, . . . , 102N via the network 112. In some aspects, the UDF processing service 122 may provide one or more of the UDFs 108, . . . , 110 to the DAG generation service so that the UDFs are included in one or more DAGs for execution by a compute node or a distributed storage node of the network-based service infrastructure 114. In an example embodiment, the UDFs 108, . . . , 110 specify an object key and object location information (e.g., specifying a storage bucket of an object store or another object store location) which is used to retrieve a data object before processing (e.g., from an object store managed by one of the distributed storage nodes 120, . . . , 122).

The DAG generation service 124 comprises suitable circuitry, logic, interfaces, and/or code and is configured to generate DAGs for processing by the distributed compute nodes 116, . . . , 118. In some embodiments, the DAG generation service 124 generates the DAGs as application-specific DAGs (e.g., based on an app executing on one of devices 102A, . . . , 102N) for performing application-specific data processing tasks. In some aspects, the DAGs include queries as well as UDFs (e.g., one or more of the UDFs 108, . . . , 110 received from devices 102A, . . . , 102N). In an example embodiment, a DAG (which can be a partial DAG) is pushed down to one of the distributed storage nodes for near-data processing (e.g., by the NDP service at distributed storage node 120). In some aspects, the compute network formed by the distributed compute nodes 116, . . . , 118 further includes a computing internal network 128 which is used for internal communications between the distributed compute nodes 116, . . . , 118.

The NDP service 126 comprises suitable circuitry, logic, interfaces, and/or code and is configured to perform near-data processing using data processing instructions received from one of the distributed compute nodes 116, . . . , 118. Even though the NDP service 126 is illustrated in FIG. 1 as being within a distributed storage node, the disclosure is not limited in this regard. More specifically, the NDP service 126 can be implemented in a dedicated node within the storage network. A more detailed description of the NDP service 126 is provided hereinbelow in connection with FIG. 2-FIG. 9.

In some aspects, the storage network formed by the distributed storage nodes 120, . . . , 122 further includes a storage internal network 130 which is used for internal communications between the distributed storage nodes 120, . . . , 122. Additionally, the network-based service infrastructure 114 includes a compute-storage network 132 which is used for enabling communication between distributed compute nodes of the compute network and distributed storage nodes of the storage network.

Network 112 may be any network that enables communication between or among machines, databases, and devices (e.g., devices 102A, . . . , 102N and distributed compute nodes 116, . . . , 118 within the network-based service infrastructure 114). Accordingly, network 112 may be a wired network, a wireless network (e.g., a mobile or a cellular network), or any suitable combination thereof. Network 112 may include one or more portions that constitute a private network, a public network (e.g., the Internet), or any suitable combination thereof.

Any of the devices shown in FIG. 1 may be implemented in a general-purpose computer modified (e.g., configured or programmed) by software to be a special-purpose computer to perform the functions described herein for that machine, database, or device. As used herein, a "database" is a data storage resource that stores data structured as a text file, a table, a spreadsheet, a relational database (e.g., an object-relational database, a NoSQL database, a network or graph database), a triple store, a hierarchical data store, or any suitable combination thereof. Additionally, data accessed (or stored) via an application programming interface (API) or remote procedure call (RPC) may be considered to be accessed from (or stored in) a database. Moreover, any two or more of the devices or databases illustrated in FIG. 1 may be combined into a single machine, database, or device, and the functions described herein for any single machine, database, or device may be subdivided among multiple machines, databases, or devices.

Figure 2:
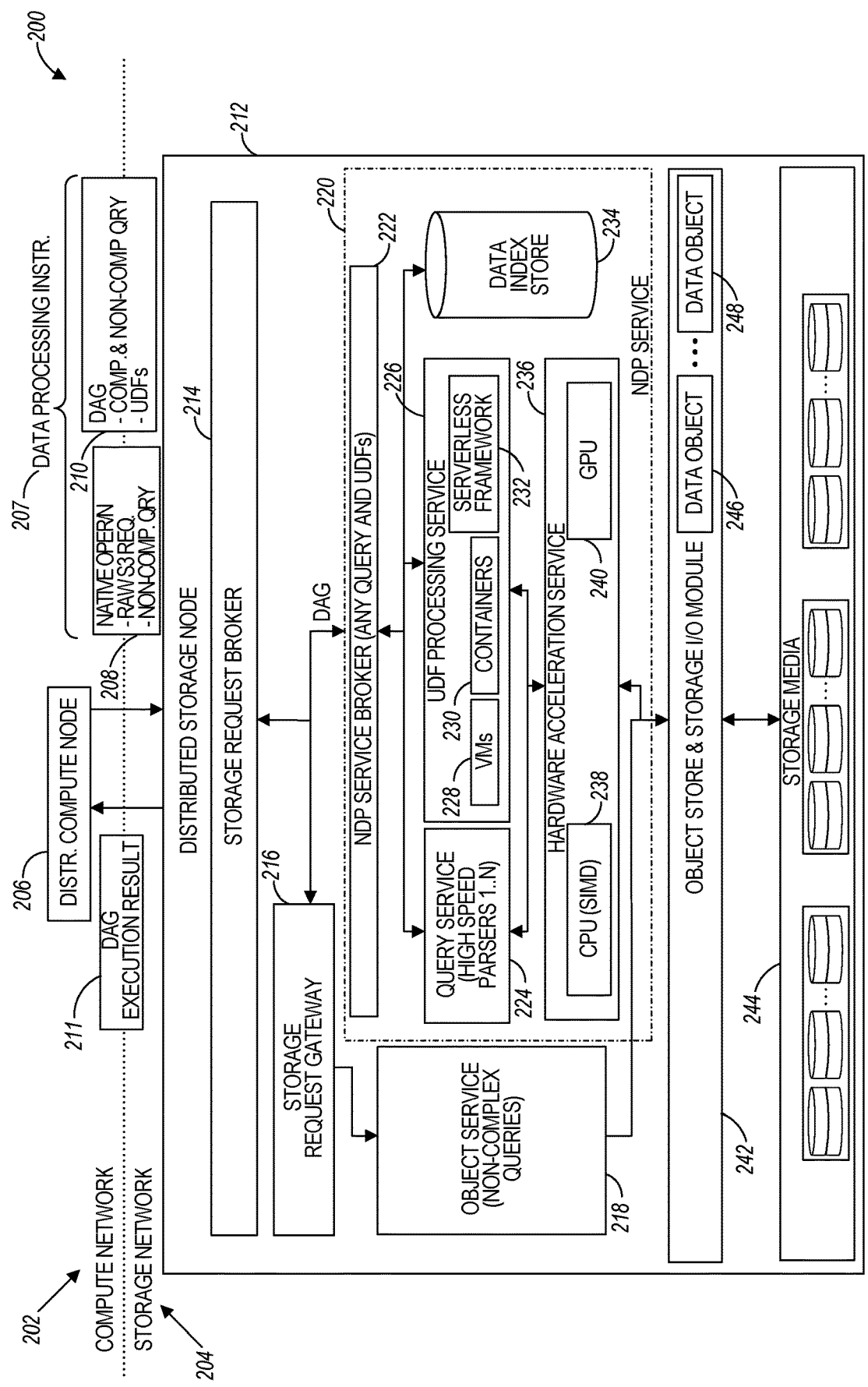
FIG. 2 is a block diagram illustrating a distributed storage node with an NDP service, according to some example embodiments.

FIG. 2 is a block diagram illustrating a distributed storage node 212 with an NDP service 220 within a network-based service infrastructure 200, according to some example embodiments. Referring to FIG. 2, the distributed storage node 212 (e.g., one of the distributed storage nodes 120, . . . , 122 in FIG. 1) in the storage network 204 is in communication with a compute node 206 (e.g., one of distributed compute nodes 116, . . . , 118 in FIG. 1) in compute network 202 within the network-based service infrastructure 200.

The distributed storage node 212 includes a storage request broker 214, a storage request gateway 216, an object service 218, an NDP service 220, and an object store 242 storing data objects 246, . . . , 248, and storage media 244. The NDP service 220 includes an NDP service broker 222, a query service 224, a UDF processing service 226, a data index store 234, and a hardware acceleration service 236. The data index store 234 can be used in connection with data-skipping operations. Specifically, the data index store 234 includes indices of data objects stored in the object store 242 which can be used for fast data access and minimizing storage I/O.

The storage request broker 214 is configured to analyze data processing instructions (e.g., data processing instruction 207) received from the compute node 206, and determine whether the data processing instruction should be processed by the object service 218 or the NDP service 220. For example, the data processing instruction 207 can include a plurality of data processing operations with at least one of the data processing operations including a legacy data processing operation 208, such as a native operation. In some embodiments, the legacy data processing operation 208 can include a raw request operation such as an Amazon Simple Storage Service (Amazon S3) request that includes a get operation (e.g., reading a data object), a put operation (e.g., storing a data object), a delete operation, and a post-operation (e.g., copying a data object), and/or a non-complex query-based operation. In some aspects, the non-complex query-based operation can include an Amazon S3 Select operation such as a projection operation, a filter operation, and a simple aggregation operation (e.g., SUM, AVERAGE, etc., without a GROUP BY operation).

In some embodiments, only the raw request operations (e.g., raw S3 requests) are sent to the object service 218 via the storage request gateway 216, while any query-based operations and other types of requests and UDFs are sent to NDP service broker 222 so that such queries and UDFs can be processed using the disclosed acceleration and optimization techniques used in the NDP service 220.

Figure 3:
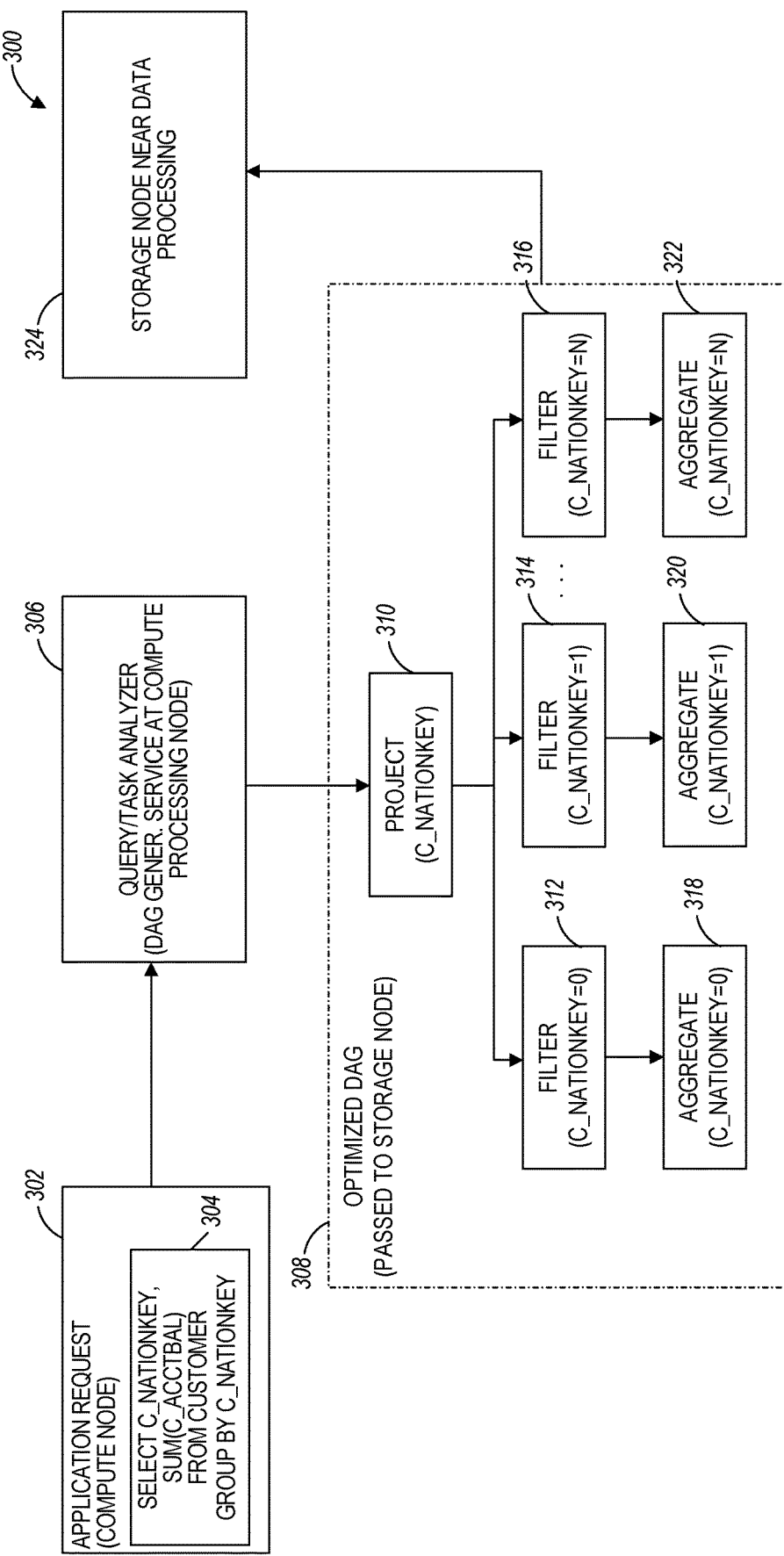
FIG. 3 is a block diagram illustrating the generation of a directed acyclic graph (DAG) for NDP in a distributed storage node, according to some example embodiments.
Figure 4:
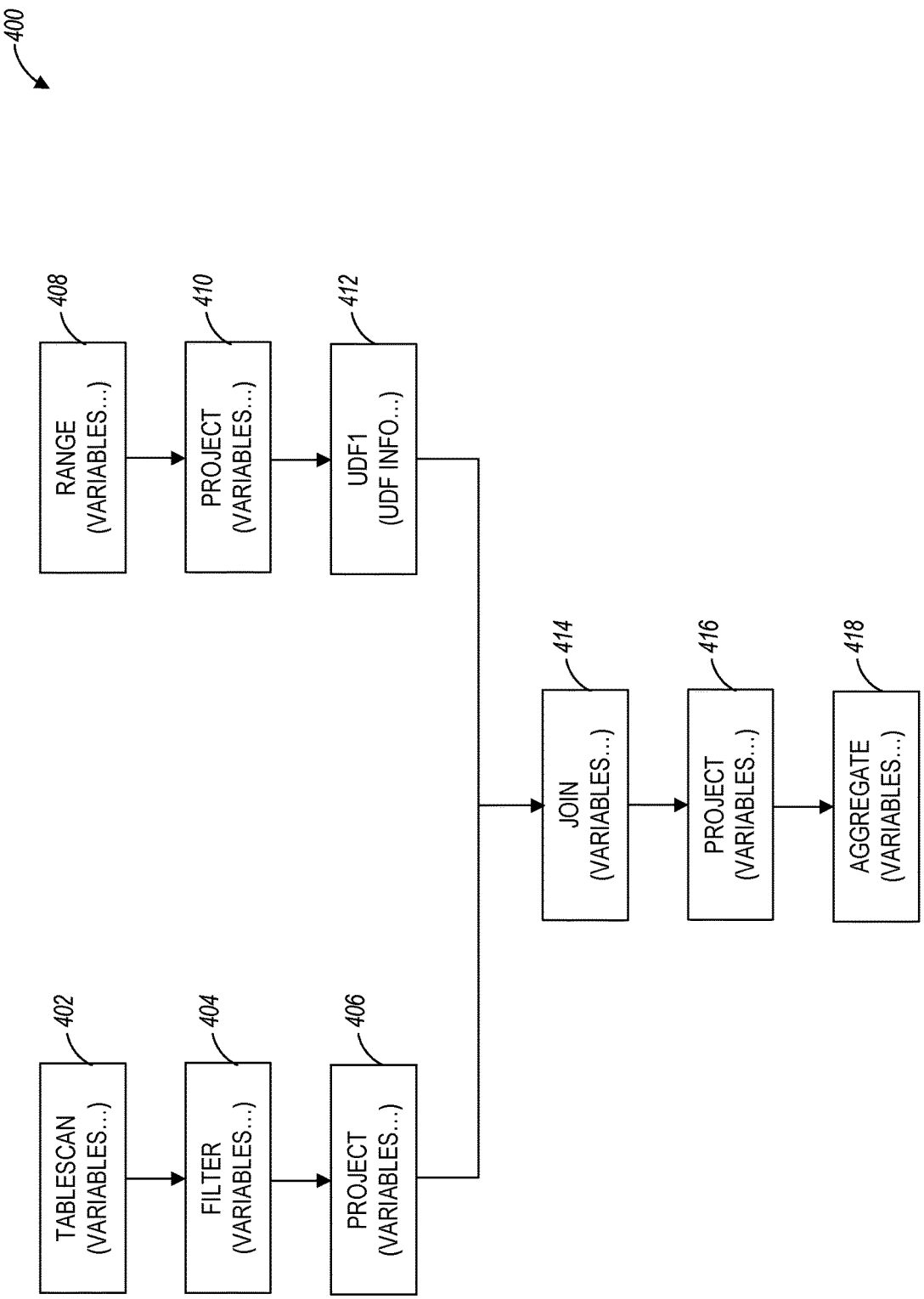
FIG. 4 is a block diagram illustrating an example DAG with a user-defined function (UDF), according to some example embodiments.
Figure 5:
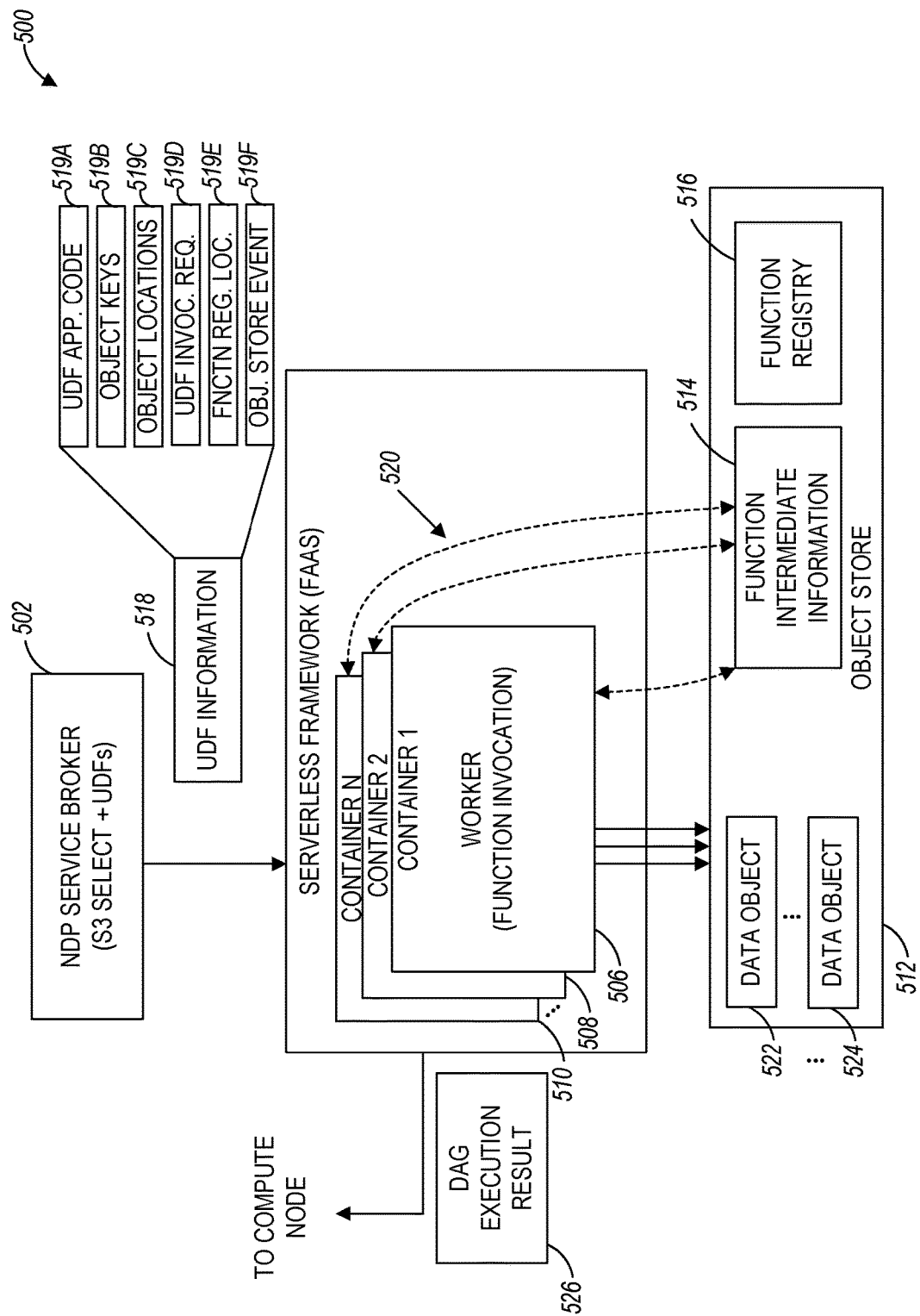
FIG. 5 illustrates a serverless framework used by the NDP service of FIG. 2 for UDF processing, according to some example embodiments.

The data processing instruction 207 can also include a DAG 210. The DAG 210 can include complex query-based operations, non-complex query-based operations, as well as UDF information associated with a UDF. Example DAGs are illustrated in FIG. 3 and FIG. 4. Example UDF information that can be communicated as part of a DAG is illustrated in FIG. 5 in FIG. 6. The non-complex query-based operations within the DAG 210 can include Amazon S3 Select operations such as data average operation, a sum operation, a grouping operation, etc. The complex query-based operations within the DAG 210 can include a grouping operation (e.g., GROUP BY), a joining operation, and a limiting operation. In this regard, the storage request broker 214 routes the data processing instruction 207 to the object service 218 via the storage request gateway 216 for processing, when the data processing instruction 207 includes the legacy data processing operation 208. The storage request broker 214 routes the data processing instruction 207 to the NDP service 220 when the data processing instruction includes the DAG 210. In some embodiments, the data processing instruction 207 may include both legacy data processing operations 208 and the DAG 210. In this case, the storage request broker 214 routes the legacy data processing operation 208 to the storage request gateway 216 for communication to the object service 218, and the DAG 210 to the NDP service 220 for processing. After the DAG 210 is processed by the NDP service 220, a DAG execution result 211 is generated and communicated back to compute node 206.

The NDP service broker 222 analyzes the received DAG 210 to determine whether it includes any complex query-based operations, non-complex query-based operations, and UDF information. The complex and non-complex query-based operations that are part of the DAG are routed to the query service 224 for processing, while the UDF information is routed to the UDF processing service 226. The UDF processing service 226 comprises suitable circuitry, logic, interfaces, and/or code and is configured to process one or more UDFs based on UDF information within the DAG 210. In this regard, the UDF processing service 226 uses at least one of the virtual machines (VMs) 228, containers 230, or serverless framework 232 to process UDFs associated with the DAG 210. A more detailed description of processing UDFs using the serverless framework 232 is provided in connection with FIG. 5 in FIG. 6.

In an example embodiment, the legacy data processing operation 208 (which can include a non-complex query-based operation), as well as the complex query-based operations and UDF information within the DAG 210, include object key information and object location information which is used to access (or retrieve) a data object (e.g., one of the data objects 246, . . . , 248) from the object store 242 for processing. In some aspects, the processing of data objects by the NDP service 220 can use hardware acceleration provided by the hardware acceleration service 236. More specifically, the hardware acceleration service 236 can use the SIMD CPU 238 and GPU 240 to accelerate certain data processing operations and improve the overall efficiency of the NDP service 220.

FIG. 3 is a block diagram 300 illustrating the generation of a directed acyclic graph (DAG) 308 for NDP in a distributed storage node, according to some example embodiments. Referring to FIG. 3, application request 302 is received at a compute node such as compute node 206 of FIG. 2. Application request 302 can include a plurality of application-specific instructions 304, including a selection instruction, a sum instruction, and a group instruction. The application request 302 is processed by a query task analyzer 306, which can be part of a DAG generation service such as the DAG generation service 124 of FIG. 1. The DAG generation service generates DAG 308 based on the application-specific instructions 304 that are part of the application request 302.

The DAG 308 includes a plurality of data processing operations which are arranged within the DAG 308 according to an execution order. For example and as illustrated in FIG. 3, the data processing operations comprise a project operation 310 that is executed first and followed by filter-aggregate operation pairs 312-318, 314-320, . . . , 316-322. The generated DAG 308 is communicated to a storage node (e.g., distributed storage node 212) for storage node near data processing 324 (e.g., performed by the NDP service 220 in the distributed storage node 212). A DAG execution result is obtained after DAG 308 is processed, and the DAG execution result can be communicated back to the compute node receiving the application request 302.

FIG. 4 is a block diagram illustrating an example DAG 400 with a user-defined function (UDF), according to some example embodiments. Referring to FIG. 4, DAG 400 can be generated by a DAG generation service 124 within distributed compute node 116 of the network-based service infrastructure 114. The DAG 400 includes a plurality of data processing operations 402-418 arranged within the DAG according to an execution order. More specifically, operations 402, 404, and 406 can be performed concurrently with data processing operations 408, 410, and 412. The result of data processing operations 406 and 412 are then used to perform sequential data processing operations 414, 416, and 418 to generate the DAG execution result.

In an example embodiment and as illustrated in FIG. 4, DAG 400 can include UDF information, which is passed by the NDP service broker 222 to the UDF processing service 226 for processing (e.g., as described in connection with FIG. 5 in FIG. 6).

FIG. 5 illustrates a serverless framework 500 used by the NDP service of FIG. 2 for UDF processing, according to some example embodiments. Referring to FIG. 5, the serverless framework 500 can be the same as serverless framework 232 used by the UDF processing service 226 within the NDP service 220.

In operation, the NDP service broker 502 (which can be the same as the NDP service broker 222 of FIG. 2) detects UDF information 518 within a DAG received by the distributed storage node (e.g., distributed storage node 212) hosting the NDP service. The UDF information can include UDF application code 519A, object keys information 519B, and object locations information 519C (including information identifying one or more object buckets or geological zones). The object keys information 519B can include one or more secure keys (or credentials) which can be used for authenticating access to data objects stored within an object store. The UDF processing service 226 uses the object keys information 519B and the object locations information 519C to retrieve the data object (e.g., one of the data objects 522, . . . , 524) from the object store 512. Additionally, the UDF processing service 226 uses resources of the storage node to execute the UDF application code 519A to determine one or more data processing functions of the UDF, pack/build the functions into containers (dockers) (e.g., containers 1, N), then deploy and serve the containers as workers 506, 508, . . . , 510 of the serverless framework 500 to perform runtime query-based invocation of the UDF as a serverless function. The serverless framework 500 will also assign resources, monitor the runtime status of the data processing functions of the UDF, and delete the container once the corresponding task is complete. As used herein, the term "worker" is interchangeable with the term "function invocation". Once all container-based workers (or function invocations) 506, . . . , 510 have completed the data processing functions of the UDF, a DAG execution result 526 is generated and is communicated back to the compute node that originally communicated a DAG with the UDF information 518.

In an example embodiment, after the UDF information 518 is received and the UDF application code 519A is executed to obtain the data processing functions of the UDF, the UDF processing service 226 can use existing VMs 228 or containers 230 to perform the data processing functions of the UDF. In comparison to the VMs 228 and the containers 230, which are constantly running within the distributed storage node 212, the serverless framework 232 will not use system resources if there is no data processing trigger such as the received UDF information. In this regard, the serverless framework 232 deploys and serves the containers as workers 506, . . . , 510 only one UDF information is received and a data object is retrieved using the UDF information. Additional functionalities performed by the serverless framework 232 include automation functionalities (e.g., the serverless framework 232 automatically manages system resources for the containers as well as manages the entire UDF lifecycle from building, deploying, serving, and deleting the containers for purposes of execution of the data processing functions of the UDF) as well as implementation functionalities (the serverless framework 232 can use container-based implementation as well as other mechanisms like web assembly, etc.).

Unlike stateless compute side serverless functions, storage side functions have associated state information (e.g., as used by BDA and AI applications). Since workers 506, . . . , 510 do not communicate directly with each other, in an example embodiment, a shared storage location within the object store 512 may be used for storing function intermediate information 514 (e.g., state information communicated by each container) via communication links 520. Additionally, communication links 520 may be used for exchanging the function intermediate information (or other state information or data) between the workers, 506, . . . , 510.

In some embodiments, the UDF application code 519A can be stored in the function registry 516 within the object store 512. In this case, the UDF information 518 can include a UDF invocation request 519D and function registry location 519E in place of the UDF application code 519A. The serverless framework 500 uses the function registry location 519E to obtain UDF application code from the function registry 516 and proceeds with execution and deployment of the workers 506, . . . , 510 to perform the runtime query-based invocation of the UDF.

In another embodiment, the UDF processing service 226 can perform an event-driven invocation of the UDF. For example, the UDF information 518 can specify an object store event 519F for invoking data processing functions associated with a UDF. For example, the object store event 519F can include performing a data manipulation process in the object store 512, such as storing a new data object or updating an existing object. Upon detecting the object store event, the serverless framework 500 can execute the UDF application code to determine the data processing functions and deploy workers 506, . . . , 510 to perform the functions of the UDF.

Figure 6:
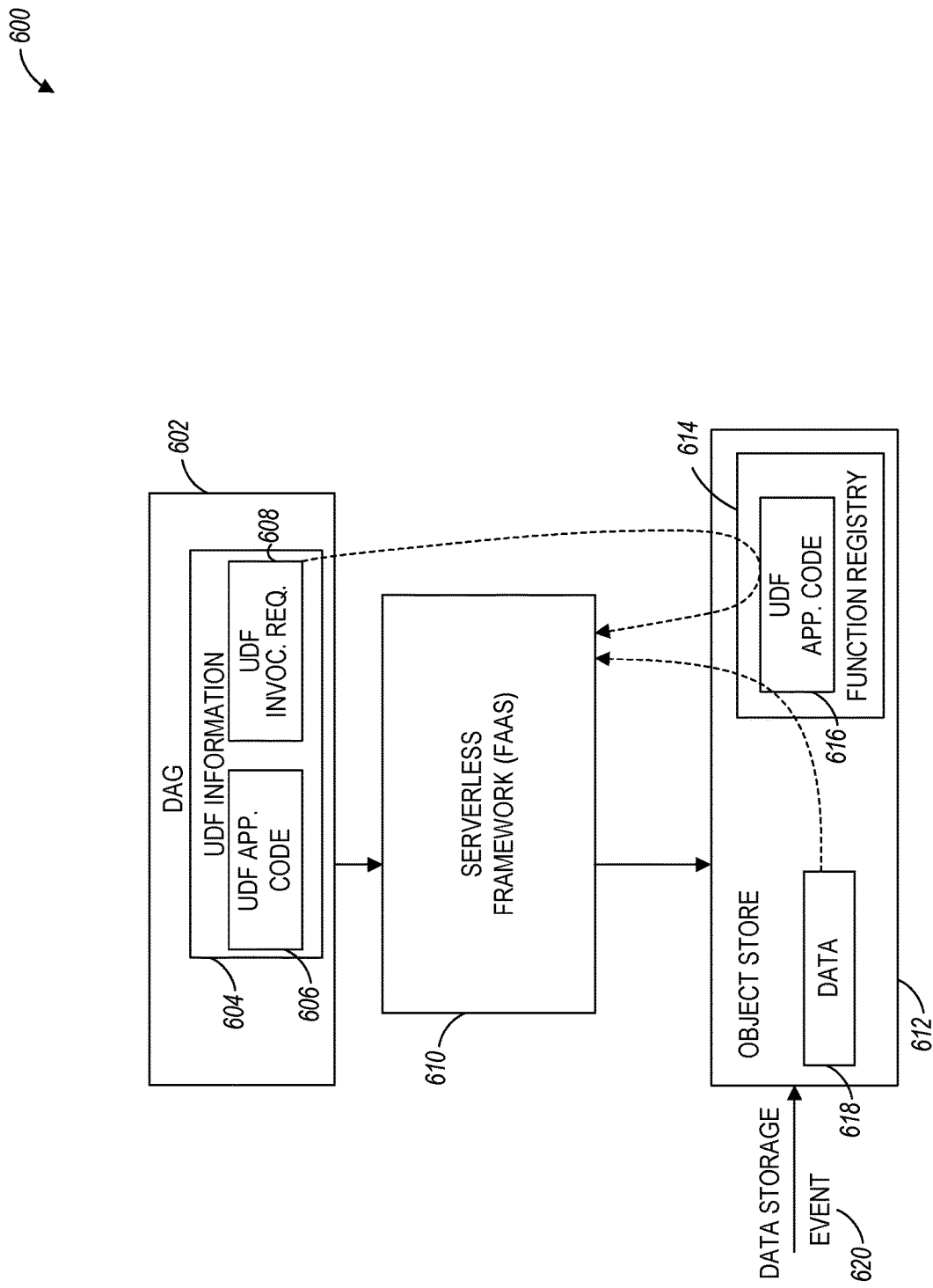
FIG. 6 is a block diagram illustrating runtime query-based invocation and an event-driven invocation of a UDF within a distributed storage node, according to some example embodiments.

FIG. 6 is a block diagram 600 illustrating runtime query-based invocation and an event-driven invocation of a UDF within a distributed storage node, according to some example embodiments. Referring to FIG. 6, a DAG 602 with UDF information 604 is received by the UDF processing services 226 for further processing by the serverless framework 610. The UDF information 604 includes UDF application code 606 and a UDF invocation request 608. The UDF application code 606 is executed based on the UDF invocation request 608 to trigger the deployment of the workers 506, . . . , 510. In another embodiment, the UDF application code 616 is stored in the function registry 614 of the object store 612. Based on the UDF invocation request 608, the serverless framework 610 can retrieve and execute the UDF application code 616 from the function registry 614 (as also described in connection with FIG. 5) to perform runtime query-based invocation of the UDF as a serverless function.

In a different embodiment, the UDF information specifies an object store event (e.g., data storage event 620) as an invocation trigger for an event-driven invocation of the UDF as a serverless function. The UDF information 604 further specifies a location within the function registry 614 of the object store 612 that stores the UDF application code 616 of the UDF. Upon detecting the data storage event 620 (e.g., storing new data 618 within the object store 612), the UDF application code 616 is executed from the function registry 614 to perform the event-driven invocation of the UDF as a serverless function.

Figure 7:
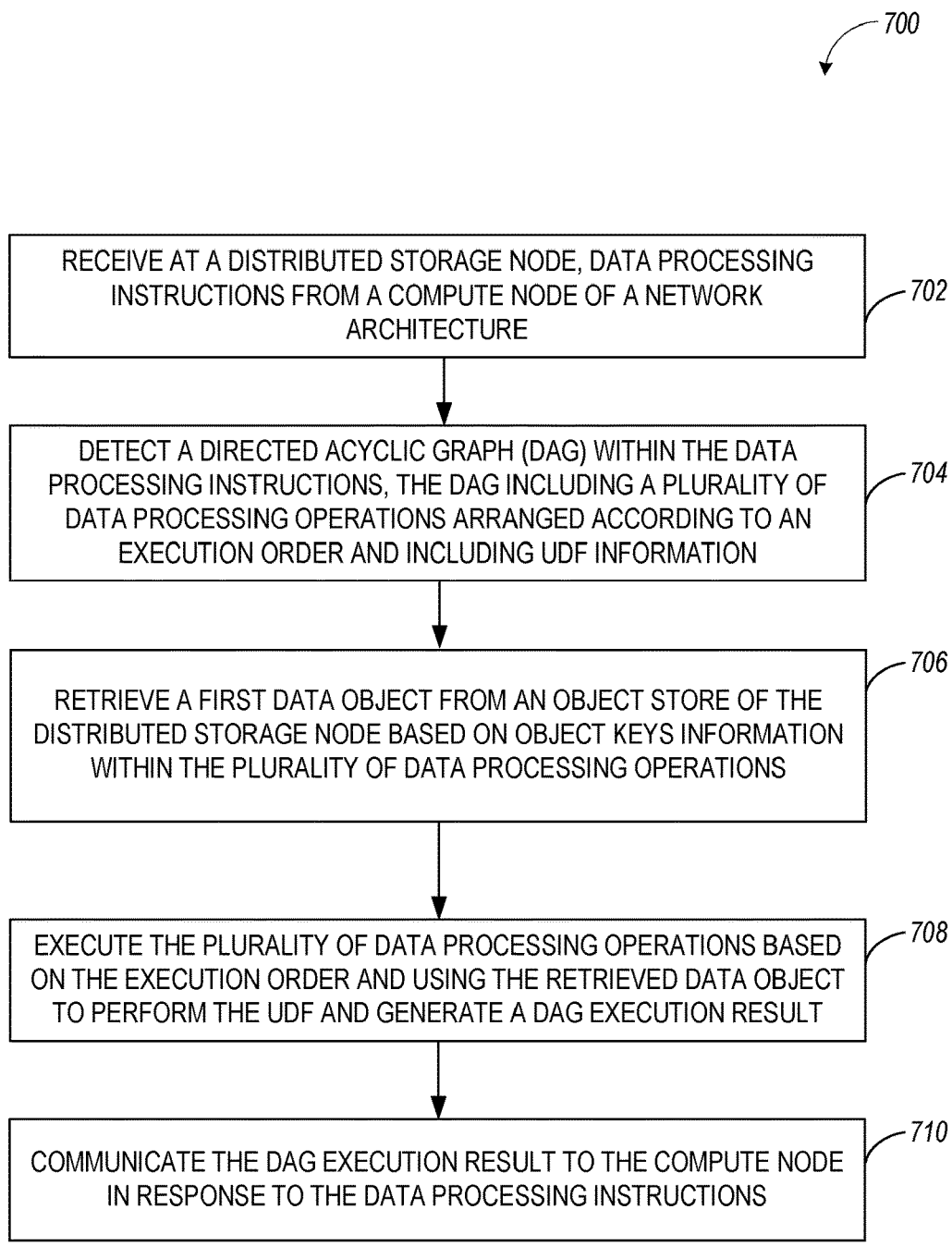
FIG. 7 is a flowchart of a method suitable for NDP within a distributed storage node of a network architecture, according to some example embodiments.

FIG. 7 is a flowchart of method 700 suitable for NDP within a distributed storage node of a network architecture, according to some example embodiments. Method 700 includes operations 702, 704, 706, 708, and 710. By way of example and not limitation, method 700 is described as being performed by the NDP service 220 of FIG. 2 (also corresponding to NDP service 860 of FIG. 8 or NDP service 960 of FIG. 9). At operation 702, data processing instructions are received at a distributed storage node from a compute node of network architecture. For example, data processing instructions 207 are received at distributed storage node 212 from compute node 206 of network-based service infrastructure 200. At operation 704, a Directed Acyclic Graph (DAG) is detected within the data processing instructions. For example, DAG 210 is detected within the data processing instructions 207 received at the distributed storage node 212. More specifically, the storage request broker 214 can detect that the data processing instructions 207 include a DAG and pass the DAG to the NDP service 220 for further processing. The DAG 210 includes a plurality of data processing operations (e.g., 310, . . . , 322 of DAG 308 in FIG. 3 data processing operations 402, . . . , 418 of DAG 400 in FIG. 4), with the plurality of data processing operations arranged within the DAG according to an execution order. The DAG 210 further includes user-defined function (UDF) information (e.g., UDF information 518) associated with a UDF.

At operation 706, at least a first data object is retrieved from an object store of the distributed storage node (or one or more other distributed storage nodes of the storage network) based on object keys information within the plurality of data processing operations. For example, each of the data processing operations of the DAG can include object keys information (e.g., object keys information 519B) and object locations information (e.g., object locations information 519C) which can be used to retrieve a data object (e.g., one of the data objects 522, . . . , 524 in FIG. 5 or 246, . . . , 248 in FIG. 2) from an object store (e.g., object store 512 or 242).

At operation 708, the plurality of data processing operations is executed using the retrieved at least first data object to perform the UDF and generate a DAG execution result, the executing of the plurality of data processing operations based on the execution order. For example, the query service 224 can execute any complex query-based operations within the DAG 210, and the UDF processing service 226 can execute one or more functions associated with a UDF based on UDF information within the DAG 210 to generate the DAG execution result (e.g., DAG execution result 211 or 526). At operation 710, the DAG execution result is communicated to the compute node in response to the data processing instructions.

Figure 8:
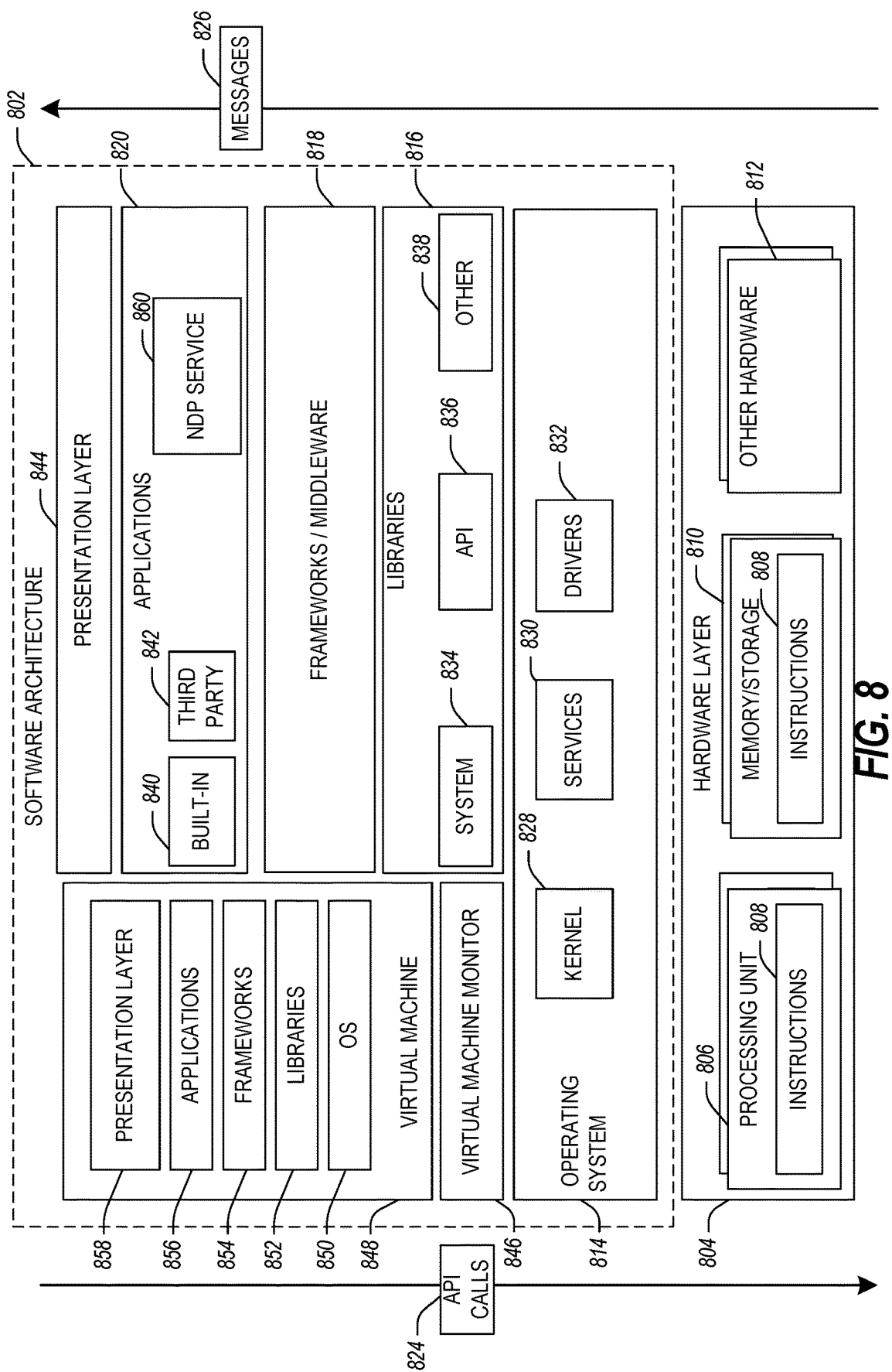
FIG. 8 is a block diagram illustrating a representative software architecture, which may be used in conjunction with various device hardware described herein, according to some example embodiments.

FIG. 8 is a block diagram illustrating a representative software architecture 802, which may be used in conjunction with various device hardware described herein, according to some example embodiments. FIG. 8 is merely a non-limiting example of software architecture 802 and it will be appreciated that many other architectures may be implemented to facilitate the functionality described herein. The software architecture 802 may be executing on hardware such as computing device 900 of FIG. 9 that includes, among other things, processor 905, memory 910, storage 915 and 920, and I/O components (or interfaces) 925 and 930. A representative hardware layer 804 is illustrated and can represent, for example, the computing device 900 of FIG. 9. The representative hardware layer 804 comprises one or more processing units 806 having associated executable instructions 808. Executable instructions 808 represent the executable instructions of the software architecture 802, including implementation of the methods, modules, and so forth of FIGS. 1-7. Hardware layer 804 also includes memory and/or storage modules 810, which also have executable instructions 808. Hardware layer 804 may also comprise other hardware 812, which represents any other hardware of the hardware layer 804, such as the other hardware illustrated as part of computing device 900.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820, and presentation layer 844. Operationally, the applications 820 and/or other components within the layers may invoke application programming interface (API) calls 824 through the software stack and receive a response, returned values, and so forth illustrated as messages 826 in response to the API calls 824. The layers illustrated in FIG. 8 are representative and not all software architectures 802 have all layers. For example, some mobile or special-purpose operating systems may not provide frameworks/middleware 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, kernel 828 may be responsible for memory management, processor management (e.g., scheduling), component management, networking, security settings, and so on. Services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 816 may provide a common infrastructure that may be utilized by the applications 820 and/or other components and/or layers. The libraries 816 typically provide functionality that allows other software modules to perform tasks more efficiently than to interface directly with the underlying operating system 814 functionality (e.g., kernel 828, services 830, and drivers 832). The libraries 816 may include system libraries 834 (e.g., C standard library) that may provide functions such as memory allocation functions, string manipulation functions, mathematic functions, and the like. Also, libraries 816 may include API libraries 836 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. Libraries 816 may also include a wide variety of other libraries 838 to provide many other APIs to the applications 820 and other software components/modules.

The frameworks/middleware 818 (also sometimes referred to as middleware) may provide a higher-level common infrastructure that may be utilized by the applications 820 and/or other software components/modules. For example, the frameworks/middleware 818 may provide various graphical user interface (GUI) functions, high-level resource management, high-level location services, and so forth. The frameworks/middleware 818 may provide a broad spectrum of other APIs that may be utilized by the applications 820 and/or other software components/modules, some of which may be specific to a particular operating system 814 or platform.

Applications 820 include built-in applications 840 and/or third-party applications 842. Examples of representative built-in applications 840 may include but are not limited to, a contacts application, a browser application, a book reader application, a location application, a media application, a messaging application, and/or a game application. Third-party applications 842 may include any of the built-in applications 840 as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™ Android™, Windows® Phone, or other mobile operating systems. In this example, the third-party application 842 may invoke the API calls 824 provided by the mobile operating system such as operating system 814 to facilitate the functionality described herein.

In some embodiments, the applications 820 further include NDP service 860, which can be the same as NDP service 220 discussed herein. In another embodiment, the NDP service 860 can be implemented as part of the operating system 814.

The applications 820 may utilize built-in operating system functions (e.g., kernel 828, services 830, and drivers 832), libraries (e.g., system libraries 834, API libraries 836, and other libraries 838), and frameworks/middleware 818 to create user interfaces to interact with users of the system. Alternatively, or additionally, in some systems, interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware machine (such as the computing device 900 of FIG. 9, for example). A virtual machine 848 is hosted by a host operating system (operating system 814 in FIG. 8) and typically, although not always, has a virtual machine monitor 846, which manages the operation of the virtual machine 848 as well as the interface with the host operating system (i.e., operating system 814). The software architecture 802 executes within the virtual machine 848 such as an operating system 850, libraries 852, frameworks/middleware 854, applications 856, and/or presentation layer 858. These layers of software architecture executing within the virtual machine 848 can be the same as the corresponding layers previously described or may be different.

Figure 9:
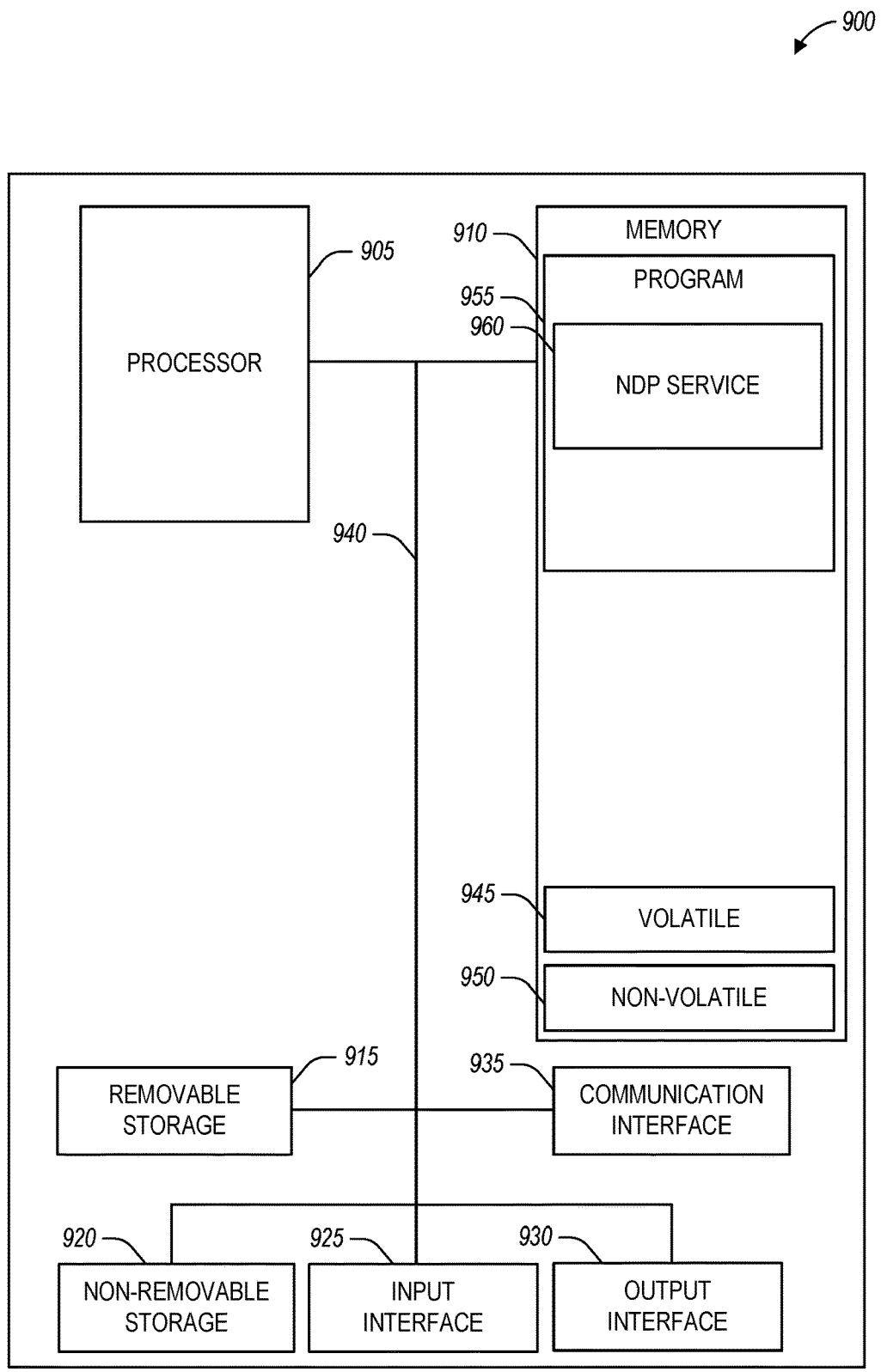
FIG. 9 is a block diagram illustrating circuitry for a device that implements algorithms and performs methods, according to some example embodiments.

FIG. 9 is a block diagram illustrating circuitry for a device that implements algorithms and performs methods, according to some example embodiments. All components need not be used in various embodiments. For example, clients, servers, and cloud-based network devices may each use a different set of components, or in the case of servers, larger storage devices.

One example computing device in the form of a computer 900 (also referred to as computing device 900, computer system 900, or computer 900) may include a processor 905, memory 910, removable storage 915, non-removable storage 920, input interface 925, output interface 930, and communication interface 935, all connected by a bus 940. Although the example computing device is illustrated and described as the computer 900, the computing device may be in different forms in different embodiments.

The memory 910 may include volatile memory 945 and non-volatile memory 950 and may store a program 955. The computer 900 may include—or have access to a computing environment that includes—a variety of computer-readable media, such as the volatile memory 945, the non-volatile memory 950, the removable storage 915, and the non-removable storage 920. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

Computer-readable instructions stored on a computer-readable medium (e.g., the program 955 stored in memory 910) are executable by the processor 905 of the computer 900. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example. As used herein, the terms "computer-readable medium" and "machine-readable medium" are interchangeable.

Program 955 may utilize services discussed herein, such as the NDP service 960. In some aspects, the NDP service 960 can be the same as the NDP service 220 discussed herein.

Any one or more of the modules described herein may be implemented using hardware (e.g., a processor of a machine, an application-specific integrated circuit (ASIC), field-programmable gate array (FPGA), or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

In some aspects, one or more of the modules (e.g., services) within the NDP service 960 can be integrated as single modules, performing the corresponding functions of the integrated modules. Put another way, the NDP service can be implemented as a single service (e.g., using resources such as a virtual machine or container) of a distributed storage node or separate components (e.g., modules or services) of the NDP service (e.g., as illustrated in FIG. 2) can be implemented separately (e.g., at the same or different storage node).

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from the described systems. Other embodiments may be within the scope of the following claims.

It should be further understood that software including one or more computer-executable instructions that facilitate processing and operations as described above concerning any one or all of the steps of the disclosure can be installed in and sold with one or more computing devices consistent with the disclosure. Alternatively, the software can be obtained and loaded into one or more computing devices, including obtaining the software through a physical medium or distribution system, including, for example, from a server owned by the software creator or from a server not owned but used by the software creator. The software can be stored on a server for distribution over the Internet, for example.

Also, it will be understood by one skilled in the art that this disclosure is not limited in its application to the details of construction and the arrangement of components outlined in the description or illustrated in the drawings. The embodiments herein are capable of other embodiments and capable of being practiced or carried out in various ways. Also, it will be understood that the phraseology and terminology used herein are for description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. Also, the terms "connected" and "coupled" and variations thereof are not restricted to physical or mechanical connections or couplings. Further, terms such as up, down, bottom, and top are relative and are employed to aid illustration, but are not limiting.

The components of the illustrative devices, systems, and methods employed following the illustrated embodiments can be implemented, at least in part, in digital electronic circuitry, analog electronic circuitry, computer hardware, firmware, software, or in combinations of them. These components can be implemented, for example, as a computer program product such as a computer program, program code, or computer instructions tangibly embodied in an information carrier, or a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or another unit suitable for use in a computing environment. A computer program can be deployed to be executed on one computer or multiple computers at one site or distributed across multiple sites and interconnected by a communication network. Also, functional programs, codes, and code segments for accomplishing the techniques described herein can be easily construed as within the scope of the claims by programmers skilled in the art to which the techniques described herein pertain. Method steps associated with the illustrative embodiments can be performed by one or more programmable processors executing a computer program, code, or instructions to perform functions (e.g., by operating on input data and/or generating an output). Method steps can also be performed by, and an apparatus for performing the methods can be implemented as, special-purpose logic circuitry, e.g., an FPGA (field-programmable gate array) or an ASIC (application-specific integrated circuit), for example.

The various illustrative logical blocks, modules, and circuits described in connection with the embodiments disclosed herein may be implemented or performed with a general-purpose processor, a digital signal processor (DSP), an ASIC, an FPGA, or other programmable logic devices, discrete gate, or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory or both. The required elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by, or incorporated into special-purpose logic circuitry.

Those with skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, "machine-readable medium" (or "computer-readable medium") means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium (or a combination of multiple media) that is capable of storing instructions for execution by one or more processors 905, such that the instructions, when executed by one or more processors 905, cause the one or more processors 905 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

Also, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the scope disclosed herein.

Although the present disclosure has been described regarding specific features and embodiments thereof, it is evident that various modifications and combinations can be made thereto without departing from the scope of the disclosure. For example, other components may be added to, or removed from the described systems. The specification and drawings are, accordingly, to be regarded simply as an illustration of the disclosure as defined by the appended claims, and are contemplated to cover any modifications, variations, combinations, or equivalents that fall within the scope of the present disclosure. Other aspects may be within the scope of the following claims.

What is claimed is:

1. A computer-implemented method for near data processing (NDP) within a distributed storage node of a network architecture, the method comprising:
   receiving, at the distributed storage node, data processing instructions from a compute node of the network architecture;
   detecting a Directed Acyclic Graph (DAG) within the data processing instructions, the DAG including a plurality of data processing operations, the plurality of data processing operations arranged within the DAG according to an execution order and including user-defined function (UDF) information associated with a UDF;
   retrieving a first data object from an object store of the distributed storage node based on object keys information within the plurality of data processing operations;
   executing the plurality of data processing operations using the retrieved first data object to perform the UDF and generate a DAG execution result, the executing of the plurality of data processing operations based on the execution order; and
   communicating the DAG execution result to the compute node in response to the data processing instructions.

2. The computer-implemented method of claim 1, further comprising:
   detecting that the data processing instructions include the DAG and a legacy data processing operation; and
   routing the legacy data processing operation to an object service of the distributed storage node for execution using a second data object from the object store, the second data object selected based on second object keys information within the legacy data processing operation.

3. The computer-implemented method of claim 2, wherein the legacy data processing operation includes a non-complex query-based operation or a raw request operation, the raw request operation including at least one of a get operation, a put operation, a post operation, and a delete operation, and the non-complex query-based operation including at least one of a filter operation and an aggregation operation.

4. The computer-implemented method of claim 2, further comprising:
   routing the DAG to an NDP service of the distributed storage node, the NDP service to configure virtual resources of the distributed storage node to perform the retrieving of at least the first data object and the executing of the plurality of data processing operations using the retrieved first data object.

5. The computer-implemented method of claim 1, wherein the plurality of data processing operations include a complex query-based operation, the complex query-based operation further including the object keys information and object location information specifying a storage bucket of the object store that stores the first data object.

6. The computer-implemented method of claim 1, wherein the UDF information includes a UDF application code of the UDF and the object keys information.

7. The computer-implemented method of claim 6, wherein the computer-implemented method further comprises:
   executing the UDF application code using a serverless framework of the distributed storage node to perform a runtime query-based invocation of the UDF as a serverless function using the first data object associated with the object keys information.

8. The computer-implemented method of claim 7, wherein performing the runtime query-based invocation of the UDF further comprises:
   deploying a plurality of container-based function invocations within the serverless framework of the distributed storage node to perform the UDF.

9. The computer-implemented method of claim 8, wherein the plurality of container-based function invocations within the serverless framework of the distributed storage node are configured to exchange state information via shared storage within the object store of the distributed storage node.

10. The computer-implemented method of claim 6, wherein the computer-implemented method further comprises:
    executing the UDF application code using a virtual machine or a container instantiated within the distributed storage node.

11. The computer-implemented method of claim 6, wherein the UDF information specifies an object store event as an invocation trigger for an event-driven invocation of the UDF as a serverless function, the UDF information further specifying a location within a function registry of the object store that stores the UDF application code of the UDF, and the computer-implemented method further comprises:
    detecting the object store event specified by the UDF information, the object store event associated with a data update of the object store; and based on the detecting of the object store event, executing the UDF application code from the function registry to perform the event-driven invocation of the UDF as the serverless function.

12. The computer-implemented method of claim 1, wherein the UDF information includes a request for invocation of the UDF on the first data object, the UDF information further specifying a location within a function registry of the object store that stores a UDF application code of the UDF, and the computer-implemented method further comprises:
   executing the UDF application code from the function registry to perform a runtime query-based invocation of the UDF as a serverless function.

13. A system comprising:
   a memory storing instructions; and
   one or more processors in communication with the memory, wherein the one or more processors execute the instructions to:
      receive at a distributed storage node, data processing instructions from a compute node of a network architecture;
      detect a Directed Acyclic Graph (DAG) within the data processing instructions, the DAG including a plurality of data processing operations, the plurality of data processing operations arranged within the DAG according to an execution order and including user-defined function (UDF) information associated with a UDF;
      retrieve a first data object from an object store of the distributed storage node based on object keys information within the plurality of data processing operations;
      execute the plurality of data processing operations using the retrieved first data object to perform the UDF and generate a DAG execution result, the executing of the plurality of data processing operations based on the execution order; and
      communicate the DAG execution result to the compute node in response to the data processing instructions.

14. The system of claim 13, wherein the UDF information includes a UDF application code of the UDF and the object keys information, and the one or more processors execute the instructions to:
   execute the UDF application code using a serverless framework of the distributed storage node to perform a runtime query-based invocation of the UDF as a serverless function using the first data object associated with the object keys information.

15. The system of claim 14, wherein to perform the runtime query-based invocation of the UDF as the serverless function, the one or more processors execute the instructions to:
   deploy a plurality of container-based function invocations within the serverless framework of the distributed storage node to perform the UDF.

16. The system of claim 15, wherein the plurality of container-based function invocations within the serverless framework of the distributed storage node are configured to exchange state information via shared storage within the object store of the distributed storage node.

17. A computer-readable medium storing computer instructions for near data processing (NDP) within a distributed storage node of a network architecture, wherein the instructions when executed by one or more processors, cause the one or more processors to perform operations comprising:
   receiving at the distributed storage node, data processing instructions from a compute node of the network architecture;
   detecting a Directed Acyclic Graph (DAG) within the data processing instructions, the DAG including a plurality of data processing operations, the plurality of data processing operations arranged within the DAG according to an execution order and including user-defined function (UDF) information associated with a UDF;
   retrieving a first data object from an object store of the distributed storage node based on object keys information within the plurality of data processing operations;
   executing the plurality of data processing operations using the retrieved first data object to perform the UDF and generate a DAG execution result, the executing of the plurality of data processing operations based on the execution order; and
   communicating the DAG execution result to the compute node in response to the data processing instructions.

18. The computer-readable medium of claim 17, wherein the UDF information includes a UDF application code of the UDF and the object keys information, and the instructions further cause the one or more processors to perform operations comprising:
   executing the UDF application code using a virtual machine or a container instantiated within the distributed storage node.

19. The computer-readable medium of claim 17, wherein the UDF information includes a request for invocation of the UDF on the first data object, the UDF information further specifying a location within a function registry of the object store that stores a UDF application code of the UDF, and the instructions further cause the one or more processors to perform operations comprising:
   executing the UDF application code from the function registry to perform a runtime query-based invocation of the UDF as a serverless function.

20. The computer-readable medium of claim 17, wherein the UDF information specifies an object store event as an invocation trigger for an event-driven invocation of the UDF as a serverless function, the UDF information further specifying a location within a function registry of the object store that stores UDF application code of the UDF, and the instructions further cause the one or more processors to perform operations comprising:
   detecting the object store event specified by the UDF information, the object store event associated with a data update of the object store; and
   based on the detecting of the object store event, executing the UDF application code from the function registry to perform the event-driven invocation of the UDF as a serverless function.

* * * * *